United States Patent [19]

Kraus et al.

[11] 4,428,476

[45] Jan. 31, 1984

[54] VIBRATORY APPARATUS

[75] Inventors: Richard B. Kraus; Albert Musschoot, both of Barrington, Ill.

[73] Assignee: General Kinematics Corporation, Barrington, Ill.

[21] Appl. No.: 401,736

[22] Filed: Jul. 26, 1982

Related U.S. Application Data

[63] Continuation of Ser. No. 175,883, Aug. 6, 1980, abandoned, which is a continuation-in-part of Ser. No. 53,855, Jul. 2, 1979, abandoned.

[51] Int. Cl.³ .............................................. B65G 27/08
[52] U.S. Cl. ..................................... 198/764; 198/766
[58] Field of Search ............... 198/760, 763, 764, 766, 198/767, 769, 770

[56] References Cited

U.S. PATENT DOCUMENTS

| | | | |
|---|---|---|---|
| 2,830,696 | 4/1958 | Musschoot | 198/760 |
| 3,165,197 | 1/1965 | Allen et al. | 198/766 |
| 3,176,834 | 4/1965 | Allen et al. | 198/767 |
| 3,291,289 | 12/1966 | Savage | 198/760 |
| 3,659,465 | 5/1972 | Oshima et al. | 198/770 |
| 4,287,056 | 9/1981 | Dumbaugh et al. | 198/770 |

FOREIGN PATENT DOCUMENTS 2712961  9/1978  Fed. Rep. of Germany ...... 198/767

Primary Examiner—Joseph E. Valenza
Assistant Examiner—Jonathan D. Holmes
Attorney, Agent, or Firm—Wood, Dalton, Phillips, Mason & Rowe

[57] ABSTRACT

The invention discloses a vibratory conveyor arranged so that the vibrations have a substantially greater horizontal than vertical movement. More particularly, the vertical acceleration of material carried by the conveyor is less than the acceleration of gravity and therefore the material conveyed does not physically leave the surface of the conveyor. The result is a smooth flow of material from one end of the trough to the other.

9 Claims, 4 Drawing Figures

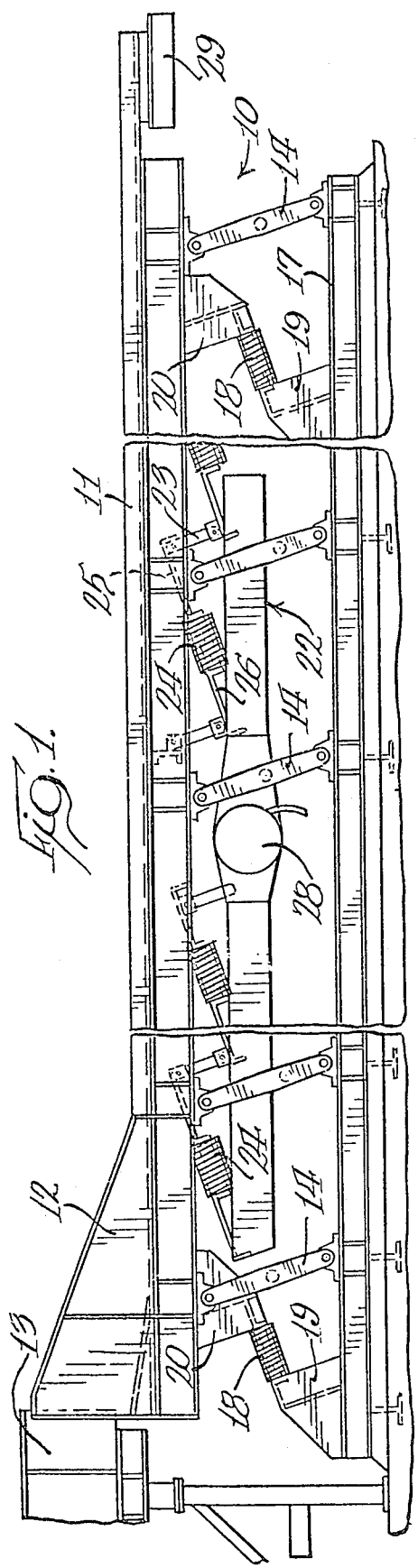
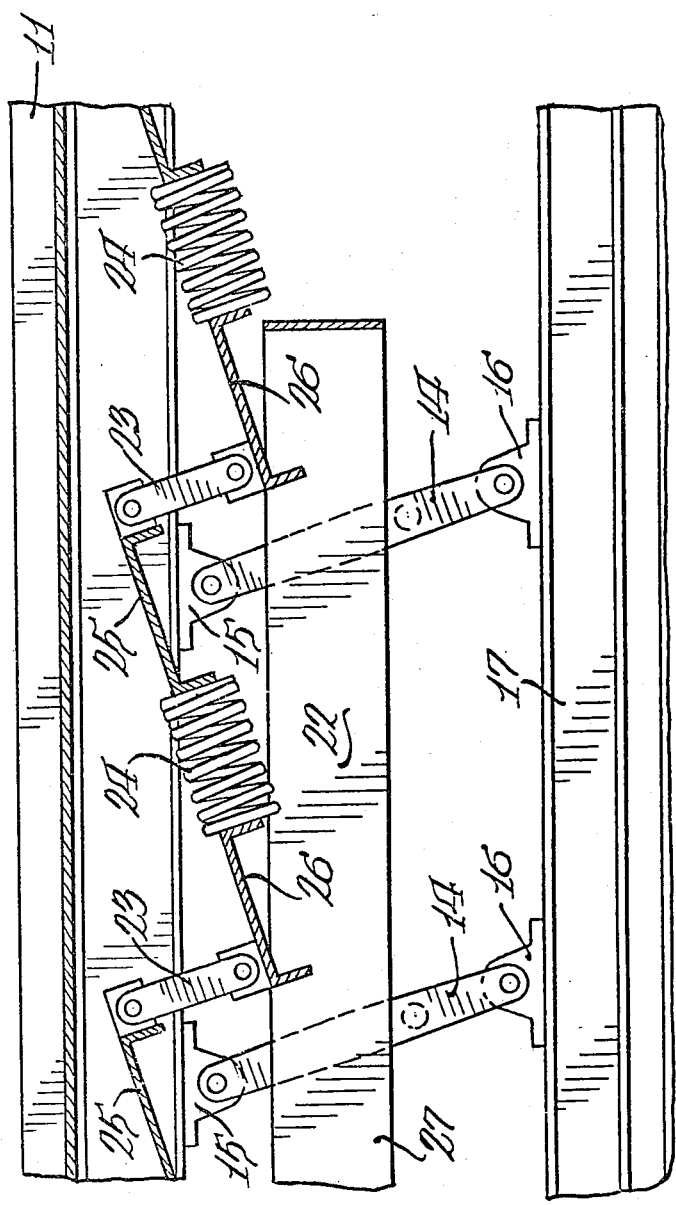

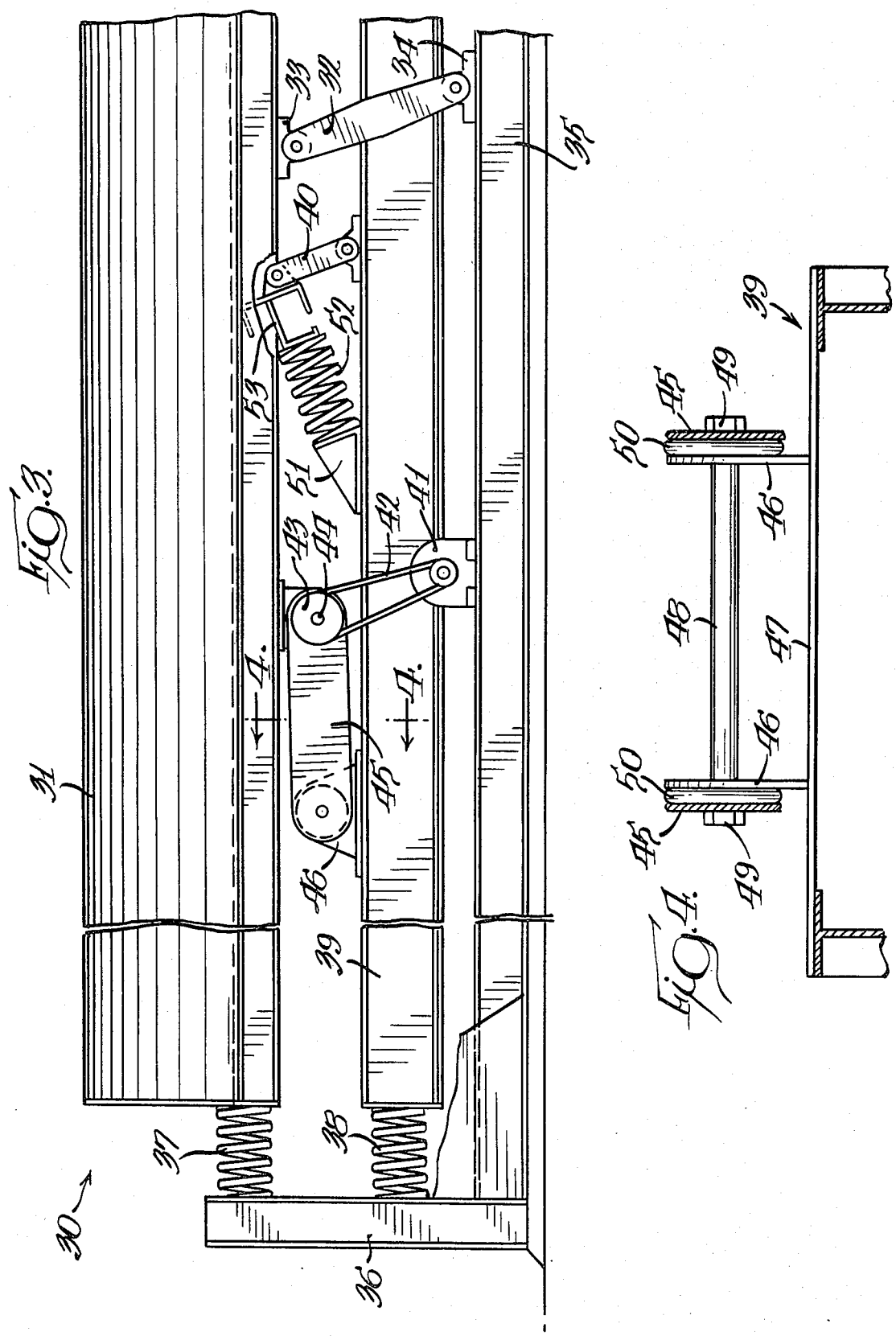

VIBRATORY APPARATUS

CROSS-REFERENCE

This application is a continuation of application Ser. No. 175,883, filed Aug. 6, 1980, now abandoned, which is a continuation-in-part of application Ser. No. 053,855, filed July 2, 1979, now abandoned.

BACKGROUND OF THE INVENTION

Vibratory conveyors have been known and used for many years. In the usual type of vibratory conveyor, the material-carrying trough is vibrated at an angle to the horizontal normally of the order of 45 degrees. The material conveyed is, in effect, bounced along the trough from one end to the other to effect the conveying action. Thus, for most of the travel the material is airborne, striking the material-carrying surface only long enough to be relaunched into the air in the direction of the discharge end of the conveyor. The vibratory action has been used not only for conveying articles from one end of the trough to the other, other functions can be achieved, such as for example, the removal of sand from castings because of the jarring or impact nature of the vibratory conveying action. Thus, the trough may be provided with a foraminous lower surface through which sand may pass as it is jarred loose from the castings. An example of such an apparatus is to be found in the Musschoot U.S. Pat. No. 3,335,861.

Because of the bouncing nature of the conveying actions, it has heretofore been difficult, if not impossible, for a worker standing alongside the trough to actually perform any work on the articles being conveyed. Thus, in a foundry operation, it is customary for a worker to knock the sprue from a casting with a hammer, but in order to do so the casting must be at rest or at least maintained in a position where such a blow can be delivered with a reasonable degree of accuracy. Heretofore, this could not be accomplished while the casting was passing along a vibratory conveyor.

SUMMARY OF THE INVENTION

The present invention provides a vibratory conveyor where the conveying action is relatively smooth and thus the articles being conveyed appear to flow from one end of the conveyor to the other rather than to bounce therealong. The smooth flow is accomplished by arranging the supports carrying the conveying trough in a manner to predetermine the vibratory direction of the trough so as to permit the trough to move primarily horizontally with only a small but necessary vertical component to facilitate conveying action. Thus, the motion of the trough is at an angle of close to 10 degrees to the horizontal, some 80 degrees from the vertical. The arrangement is such that the vibratory forces applied to the trough in a vertical direction accelerate the material in the trough upwardly at a lesser degree than the acceleration due to gravity. Thus, the articles never leave the trough but are always supported thereby, although because there is a vertical component in the vibration, the articles are substantially unweighted during the vibratory cycle and will appear to flow from one end of the conveyor to the other. As the motion of the articles being conveyed is smooth and without bounce, it is easy for a workman standing beside the trough to deliver a blow to the sprue of a casting and free the casting therefrom.

A further feature of the invention is the unique mounting and support for the material-carrying trough and exciter relative to the base, the particular arrangement being one in which the base for the most part is supporting only the weight of the apparatus, i.e., the weight of the trough and exciter, and the dynamic forces generated by the vibrations of the trough and exciter are isolated from the base so that substantially no dynamic forces are transmitted to the base. This is a particularly important feature in very long conveyors where heretofore substantial dynamic forces were transmitted to the base and thus required a much heavier construction.

DESCRIPTION OF THE DRAWINGS

FIG. 1 is a side elevational view of a conveyor embodying the features of the invention;

FIG. 2 is an enlarged sectional view of a portion of the apparatus shown in FIG. 1;

FIG. 3 is a view like FIG. 1 showing a modified form of the invention; and

FIG. 4 is a vertical section along line 4—4 of FIG. 3.

DESCRIPTION OF THE PREFERRED EMBODIMENT

Referring now to FIGS. 1 and 2 of the drawings, there is shown a vibratory conveyor 10 having a material-carrying member in the form of a trough 11. The trough is elongated from an entrance chute 12 at the left-hand end thereof (as seen in FIG. 1), which chute receives material from a conveyor 13 stationarily mounted adjacent the chute.

The trough 11 is carried by a plurality of parallel legs 14, each pivotally secured at its upper end to brackets 15 mounted on the underside of the trough 11 and at their lower end to a bracket 16 mounted upon a base 17 fixed to the building or other structures carrying the apparatus. The legs in the particular embodiment shown are arranged at an angle of from 70 to 80 degrees to the horizontal, with an angle of approximately 72-½ degrees being preferred where the smooth flow of the material being conveyed is of primary concern.

A plurality of isolation springs 18 extend between and are secured to brackets 19 fixed to the base 17 and brackets 20 fixed to the underside of the trough 11. The isolation springs 18 are shown as coil springs whose axes extend at right angles to the legs 14.

Suspended beneath the trough 11 is an exciter member 22 carried by a plurality of parallel arms 23 each pivoted at one end to the trough and at the other end to the exciter member. A plurality of force transmitting springs 24 extend upwardly from the exciter to the trough, with each of said springs bearing at its lower end against U-shaped channels 25, extending transversely beneath the trough and secured thereto and a second plurality of channel members 26 extending transversely between the sides 27 of the exciter member and being secured thereto. The force transmitting springs 24 have axes which are parallel to the axes of the isolation springs 18 and the arms 23 are parallel to the legs 14.

The exciter member 22 is elongated in a direction parallel to the elongation of the trough 11 with the exciter including parallel side members 27 between which the transverse channels extend. The weight of the exciter is approximately 50 percent of the weight of the trough and as during vibration it moves in a direction opposite to the direction of the trough, it serves not only as an exciter but also as a counterbalance member to diminish the amount of vibrational force imparted to the structure in which the conveyor is housed.

An electric motor 28 is carried on the exciter member 22 with the electric motor having a shaft extending horizontally and transverse to the direction of elongation of the trough. The shafts of the motor are connected to eccentric weights and the arrangement is preferably that shown in Musschoot U.S. Pat. No. 3,358,815, so that the vibratory force imparted by the motor to the exciter may be varied from substantially zero to maximum. Thus, the amplitude of the movement of the exciter and hence the trough may be varied to produce the desired flow characteristics of the material being conveyed by the trough.

Because the direction of vibration of the trough 11 in the particular embodiment shown is substantially parallel to the axes of the isolation springs 18, the motion is primarily horizontal and thus very little vertical vibrational force must be carried by the base 17. Because the vertical vibrational force is minimized, the vibratory conveyor of the present invention may be mounted on a relatively light foundation and thus may be actually mounted and used on upper floors of a building rather than being confined to the lowermost floor where it can be supported on relatively massive foundations.

Furthermore, because of the arrangement of the legs 14 and arms 23 relative to the isolation springs 18, substantially none of the dynamic force of the vibrating masses is transmitted to the base 17. The absence of such dynamic force on the base permits it to be designed simply to carry the weight of the apparatus without necessarily possessing the strength to absorb and accommodate dynamic vibrational forces normally imparted to such bases in the normal form of construction of vibratory conveyors.

Referring to FIGS. 3 and 4 of the drawings, there is shown a vibratory conveyor 30 having a material-carrying member in the form of a trough 31. The trough is elongated, similar to that described with reference to FIG. 1, and is carried by a plurality of parallel legs 32 each pivotally secured at its upper end to brackets 33 mounted on the underside of the trough 31 and at its lower end to bracket 34 mounted upon a base 35 fixed to the building or other structure in which the apparatus is housed. The legs 32, of which there are a plurality such as shown in FIG. 1, are arranged at an angle of 70 to 80 degrees to the horizontal with an angle of approximately 72-½ degrees being preferable.

At each end of the base 35 is secured an upstanding stop member 36 (only one of which ends is shown in FIG. 3). Secured to each of the stop members 36 are isolation springs 37 and 38. The isolation springs extend horizontally and are arranged to be contacted by the trough 31 and an exciter-balancer member 39 which is supported from the trough by a plurality of pivoted links 40.

The exciter member 39 has a weight equal to approximately one-half the weight of the material-carrying member 31 and the spring 38 has a stiffness equal to approximately one-half the stiffness of the spring 37. Thus, as the material-carrying member 31 and exciter-balancer member 39 move in opposite directions, the impact of the material-carrying member against the spring 37, for example to the left in FIG. 3, is counteracted by the impact of the exciter-balancer member 39 against a spring in the right-hand end of the base 35 comparable to the spring 38. Thus, the forces exerted on the base are substantially equal and opposite.

For creating the vibratory movements of the material-carrying member and exciter-balancer, there is provided an electric motor 41 mounted on the base 35 and connected by means of a belt drive 42 to a wheel 43 secured to an eccentric shaft 44. The eccentric shaft 44 carries a crank arm member 45 connected to a bracket 46 secured to the exciter member 39. The connection of the crank arm member 45 to the exciter 39 is flexible or cushioned as shown in FIG. 4. Thus, there is upstanding from the upper surface 47 of the exciter member 39 spaced brackets 46 and a shaft 48 provided with nuts 49 which serves to brace the inner faces of the crank arm 45 against annular rubber members 50. Thus the driving connection between the crank arm assembly 45 and the exciter member is cushioned or resilient inasmuch as the drive is transmitted through shear of the rubber members 50.

Along the upper surface of the exciter member 39 are a number of brackets 51 carrying force transmitting springs 52, the opposite ends of which bear against a bracket assembly 53 secured to the underside of the material-carrying member 31. Like the embodiment shown in FIG. 1, a plurality of such force transmitting spring assemblies are provided interconnecting the material-carrying member and the exciter.

Like the embodiment of FIG. 1, the vibratory conveyor of FIG. 3 operates in a manner to provide a vertical acceleration to particulate material carried by the trough less than the acceleration of gravity. Furthermore, the vibratory forces are substantially isolated by the isolation spring assemblies 37 and 38 so that no special foundations for the base 35 are required.

In the arrangement shown in FIGS. 3 and 4, the force transmitting springs in combination with the exciter member and material-carrying member form a two mass vibratory system having a natural frequency. It is desirable that the rotation of the eccentric shaft 44 be at a speed substantially equal to but slightly below such natural frequency. Hence, the size of the grooved wheels over which the belt 42 passes and the speed of the motor 41 are arranged to produce rotation of the eccentric shaft at that speed.

We claim:

1. A vibratory conveyor comprising an elongated material-carrying member, a base, a plurality of legs for pivotally supporting the material-carrying member on the base for generally horizontal reciprocating movement, first spring means for isolating the material-carrying member from the base, an exciter member, second spring means for isolating the exciter member from the base, said exciter member being elongated in the direction of the elongation of the material-carrying member, a plurality of arms suspending the exciter member from the material-carrying member for generally horizontal reciprocating movement, said first isolation spring means being positioned to be compressed by the material-carrying member alternately at the end of each reciprocal movement of said material-carrying member and said second isolation spring means being positioned to be compressed by the exciter member alternately at the end of each reciprocal movement of said exciter member, a plurality of force transmitting springs extending upwardly from the exciter member to the material-carrying member along an axis substantially perpendicular to the legs, vibration generating means mounted on the material-carrying member for imparting vibratory movement to said material-carrying member and to said exciter member, and means for driving said vibration generating means.

2. A vibratory conveyor as claimed in claim 1 wherein said first isolation spring means is secured to the base at one end thereof and extends horizontally to the material-carrying member and wherein said second isolation spring means is secured to the base at one end thereof and extends horizontally to the exciter member.

3. A vibratory conveyor as claimed in claim 1 wherein said first isolation spring means has a spring stiffness approximately double the stiffness of the second isolation spring means and wherein said exciter member has a mass equal to approximately one-half of the mass of the material-carrying member.

4. A vibratory conveyor as claimed in claim 1 wherein each leg extends from the base to the material-carrying member at an angle of from 70° to 80° with the horizontal and wherein each force transmitting spring extends upwardly from the exciter member to the material-carrying member at an angle of from 10° to 20° with the horizontal.

5. A vibratory conveyor as claimed in claim 1 wherein said means for driving said vibration generating means is a motor mounted on said base and wherein a belt drive connects said motor to said vibration generating means.

6. A vibratory conveyor as claimed in claim 1 wherein said driving means is a motor mounted on the base, and wherein said vibration generating means comprises an eccentric shaft rotatably carried by the material-carrying member, a belt drive connecting the motor to the shaft to rotate the shaft, a crank arm having one end yieldably carried by the eccentric shaft and yieldably secured at its other end to the exciter member, said force transmitting springs in combination with the material-carrying member and the exciter member have a predetermined natural frequency and said motor and belt drive being constructed and arranged to rotate said eccentric shaft at a speed near but below said natural frequency.

7. A vibratory conveyor comprising an elongated material-carrying member, a base, a plurality of legs supporting the material-carrying member for generally horizontal reciprocating movement, each leg having one end pivotally secured to the material-carrying member and the other end pivotally secured to the base, each leg extending from the base to the material-carrying member at an angle of from 70° to 80° with the horizontal, first isolation spring means secured to the base at one end thereof and extending to the material-carrying member, an exciter member, second isolation spring means secured to the base at one end thereof and extending to the exciter member, said first isolation spring means having a spring stiffness approximately double the stiffness of the second isolation spring means, said exciter member being elongated in the direction of the elongation of the material-carrying member and said exciter member having a mass equal to approximately one-half of the mass of the material-carrying member, a plurality of arms suspending the exciter member from the material-carrying member for generally horizontal reciprocating movement, each of said arms having one end pivotally secured to the material-carrying member and the other end pivotally secured to the exciter member, said first isolation spring means being positioned to be contacted by the material-carrying member alternately at the end of each reciprocal movement of said material-carrying member and said second isolation spring means being positioned to be contacted by the exciter member alternately at the end of each reciprocal movement of said exciter member, a plurality of force transmitting springs, each of said force transmitting springs having one end secured to the material-carrying member and the other end secured to the exciter member, each force transmitting spring extending upwardly from the exciter member to the material-carrying member at an angle of from 10° to 20° with the horizontal, a motor mounted on the base, an eccentric shaft rotatably carried by the material-carrying member, a belt drive connecting the motor to the shaft to rotate the shaft, a crank arm having one end yieldably carried by the eccentric shaft and yieldably secured at its other end to the exciter member, said force transmitting springs in combination with the material-carrying member and the exciter member having a predetermined natural frequency and said motor and belt drive being constructed and arranged to rotate said eccentric shaft at a speed near but below said natural frequency.

8. A vibratory conveyor comprising an elongated material-carrying member, a base, a plurality of legs supporting the material-carrying member with each leg having one end pivotally secured to the material-carrying member and the other end pivotally secured to the base, an exciter member, said exciter member being elongated in the direction of the elongation of the material-carrying member, a plurality of arms suspending the exciter from the material-carrying member, each of said arms having one end pivotally secured to the material-carrying member and the other end pivotally secured to the exciter member, first isolation spring means secured to the base and mounted to extend to the material-carrying member, second isolation spring means secured to the base and mounted to extend to the exciter member, said first isolation spring means being positioned to be compressed by the material-carrying member alternately at the end of each reciprocal movement of said material-carrying member and said second isolation spring means being positioned to be compressed by the exciter member alternately at the end of each reciprocal movement of said exciter member, a plurality of force transmitting springs, each of said force transmitting springs having one end secured to the material-carrying member and the other end secured to the exciter member, each force transmitting spring extending upwardly from the exciter member to the material-carrying member at an angle of approximately 90° relative to said legs, and means for vibrating the exciter member.

9. A vibratory conveyor comprising an elongated material-carrying member, a base, a plurality of legs supporting the material-carrying member with each leg having one end pivotally secured to the material-carrying member and the other end pivotally secured to the base, an exciter member, said exciter member being elongated in the direction of the elongation of the material-carrying member and said exciter member having a length approximately equal to the length of said material-carrying member and having a mass equal to approximately one-half of the mass of the material-carrying member, a plurality of arms suspending the exciter from the material-carrying member, each of said arms having one end pivotally secured to the material-carrying member and the other end pivotally secured to the exciter member, first isolation spring means secured to the base and mounted to extend horizontally to the material-carrying member, second isolation spring means secured to the base and mounted to extend horizontally to the exciter member, said first isolation spring means having a spring stiffness approximately double the stiffness of the second isolation spring means, said first isolation spring means being positioned to be compressed by the material-carrying member alternately at the end of each reciprocal movement of said material-carrying member and said second isolation spring means being positioned to be compressed by the exciter member alternately at the end of each reciprocal movement of said exciter member, a plurality of force transmitting springs, each of said force transmitting springs having one end secured to the material-carrying member and the other end secured to the exciter member, each force transmitting spring extending upwardly from the exciter member to the material-carrying member at an angle of approximately 90° relative to said legs, and means for vibrating the exciter member at a rate and magnitude to produce vertical acceleration on material carried by the material-carrying member less than the acceleration of gravity.

* * * * *